United States Patent
Grawitter et al.

(10) Patent No.: US 11,424,950 B2
(45) Date of Patent: Aug. 23, 2022

(54) CAN COMMUNICATION PROTOCOL SYSTEM FOR EXCHANGING FUEL AND/OR OPERATING FLUID CONSUMPTION-OPTIMIZING AND NOISE-OPTIMIZING MESSAGES BETWEEN DRIVE COMPONENTS AND OUTPUT COMPONENTS

(71) Applicant: DEUTZ Aktiengesellschaft, Cologne (DE)

(72) Inventors: Martin Grawitter, Huerth (DE); Jens Wannhoff, Bergisch-Gladbach (DE); Samir Elfi, Herzogenrath (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 17/123,689

(22) Filed: Dec. 16, 2020

(65) Prior Publication Data
US 2021/0184889 A1    Jun. 17, 2021

(30) Foreign Application Priority Data

Dec. 16, 2019  (DE) .................... 10 2019 008 686.4
Oct. 15, 2020  (DE) .................... 10 2020 006 328.4

(51) Int. Cl.
*H04L 12/40*    (2006.01)

(52) U.S. Cl.
CPC .. *H04L 12/40013* (2013.01); *H04L 12/40039* (2013.01); *H04L 12/40078* (2013.01);
(Continued)

(58) Field of Classification Search
CPC ......... H04L 12/40039; H04L 12/40078; H04L 12/40136
See application file for complete search history.

(56) References Cited

U.S. PATENT DOCUMENTS 6,321,127 B1    11/2001  Kondo
7,593,999 B2 *   9/2009  Nathanson ................... 701/300
(Continued)

FOREIGN PATENT DOCUMENTS

DE         19909121 A1    9/1999
DE   10 2008 005 712 A1   7/2009

OTHER PUBLICATIONS

Wikipedia Article:"Verbrennungsmotor," Version Dec. 11, 2019, downloaded on Apr. 14, 2021 from https://de.wikipedia.org/w/index.php?title=Verbrennungsmotor&oldid=194814716; See English machine translation.

*Primary Examiner* — Henry Tsai
*Assistant Examiner* — Christopher A Daley
(74) *Attorney, Agent, or Firm* — Davidson, Davidson & Kappel, LLC

(57) ABSTRACT

A CAN communication protocol system for exchanging fuel consumption-optimizing and/or operating fluid consumption-optimizing and noise-optimizing messages between drive components and output components, which also help to increase the overall availability of the system, and method. Described is also a CAN communication protocol system for an internal combustion engine for exchanging fuel consumption-optimizing and/or operating fluid consumption-optimizing and noise-optimizing messages between drive components and output components, which also help to increase the overall availability of the system.

16 Claims, 2 Drawing Sheets

(52) U.S. Cl.
CPC .............. *H04L 12/40136* (2013.01); *H04L 2012/40215* (2013.01)

(56) References Cited

U.S. PATENT DOCUMENTS

| | | | | |
|---|---|---|---|---|
| 7,623,953 B2* | 11/2009 | Withrow | ............ | B01D 53/9495 |
| | | | | 701/101 |
| 8,738,270 B2* | 5/2014 | Emberson | ............... | F02D 28/00 |
| | | | | 701/102 |
| 9,488,116 B2* | 11/2016 | Mosher | .................. | F02D 41/22 |
| 9,885,294 B2* | 2/2018 | Park | ...................... | F02D 29/02 |
| 9,922,557 B2* | 3/2018 | Nathanson | ............. | G08G 1/162 |
| 10,650,621 B1* | 5/2020 | King | ....................... | H04L 67/10 |
| 2014/0207351 A1* | 7/2014 | Mosher | .................. | F02D 41/22 |
| | | | | 701/70 |
| 2017/0026198 A1 | 1/2017 | Ochiai et al. | | |
| 2017/0221357 A1* | 8/2017 | Nathanson | ............ | H04L 67/025 |

\* cited by examiner

CAN COMMUNICATION PROTOCOL SYSTEM FOR EXCHANGING FUEL AND/OR OPERATING FLUID CONSUMPTION-OPTIMIZING AND NOISE-OPTIMIZING MESSAGES BETWEEN DRIVE COMPONENTS AND OUTPUT COMPONENTS

This claims the benefit of German Patent Applications DE 10 2019 008 686.4, filed Dec. 16, 2019 and DE10 2020 006 328.4, filed Oct. 15, 2020, both of which are hereby incorporated by reference herein.

The present disclosure relates to a CAN communication protocol system, along with an internal combustion engine and a method for operating same, for exchanging fuel consumption-optimizing and/or operating fluid consumption-optimizing and noise-optimizing messages between drive components and output components, which also help to increase the overall availability of the system.

BACKGROUND

Such systems are known from DE 199 09 121 A1, in which a method is described for providing a communication between controllers using fewer communication lines than previously customary.

DE 10 2008 005 712 A1 describes a method and a system for controlling engines, as well as a corresponding computer program including a computer-readable storage medium.

It is known for example to lower the operating speed of the drive engine, to display the consumption characteristic and the efficiencies of the components in the controllers (for example implementing the (diesel) engine consumption characteristic in the controller of the hydraulic pumps), training the systems during operation or by programming on the basis of measurements, and specific design/coordination of individual components in relation to one another.

The disadvantage here is that it is complicated and labor-intensive to use the described methods.

These known systems disadvantageously have to perform the following two steps:

(1) perform (additional) complex technical measurements for the coordination of the system, and (2) perform training/programming.

Steps 1 through 2 must be repeated for each new combination of components. A new training phase/procedure will be necessary after a change of component. System states (for example engine and EAT (Exhaust After-Treatment) combustion function) are not taken into consideration.

SUMMARY

It is an object of the present disclosure to eliminate the aforementioned disadvantages and to create a system that determines the best efficiency. The aim is intended to be that of creating an overarching basis for communication, which makes it possible to combine freely selectable combinations of drive components and output components. The communication must exchange all the information necessary for optimized operation, so that the system made up of the aforementioned components is immediately ready for operation (Plug and Play/Perform) and the aforementioned disadvantages are eliminated.

The present disclosure provides a CAN communication protocol system for an internal combustion engine for exchanging fuel consumption-optimizing and/or operating fluid consumption-optimizing and noise-optimizing messages between drive components and output components, which also help to increase the overall availability of the system.

The present disclosure also provides an internal combustion engine including a CAN communication protocol system for exchanging fuel consumption-optimizing and/or operating fluid consumption-optimizing and noise-optimizing messages between drive components and output components, which also help to increase the overall availability of the system.

The present disclosure also provides a method for operating an internal combustion engine.

Drive components and output components are continuously exchanging data, such as for example power requests, gradients, reaction times, statuses, speeds, etc., in order thereby to determine in each case the efficiency point that is best for the individual system. By optimizing the individual efficiencies, the optimal overall efficiency is also achieved. By exchanging operating states, all components may take the others into consideration. Based thereon, it is possible to switch on protective functions which serve to protect the components. By prioritizing the statuses, system protection may be placed above consumption optimization. This is to the benefit of the overall availability of the system.

The perfect coordination of the drive component to the output components ensures a markedly lower consumption of diesel and consumables (for example DEF/Ad-Blue), lower noise emission, and higher overall system availability. By exchanging information, the system made up of the aforementioned components is ready for operation immediately and/or with little effort (Plug and Play/Perform). Agreed and content-coordinated CAN messages are exchanged in order to enable, inter alia, consumption-optimized operation between drive components and output components. States of drive components internal to the engine, for example, are taken into consideration as a basis for the content of the exchanged messages.

The advantageous coordination of the drive components to the output components ensures a significantly lower consumption of diesel and consumables, such as for example Ad-Blue (DEF), lower noise emissions, and higher overall system availability. By exchanging information, the system is ready for operation immediately.

A description will advantageously be given here of the functions and the SAE J1939 communication interface which are added to the (electronic motor regulator) EMR4 & EMR5 engine control units from DEUTZ AG in order to be able to implement DEUTZ AG's Dynamic Best Point Control (DBPC) function.

BRIEF DESCRIPTION OF THE DRAWINGS

The present disclosure will be explained by way of example below on the basis of the drawings, in which.

DETAILED DESCRIPTION

Figure 1:
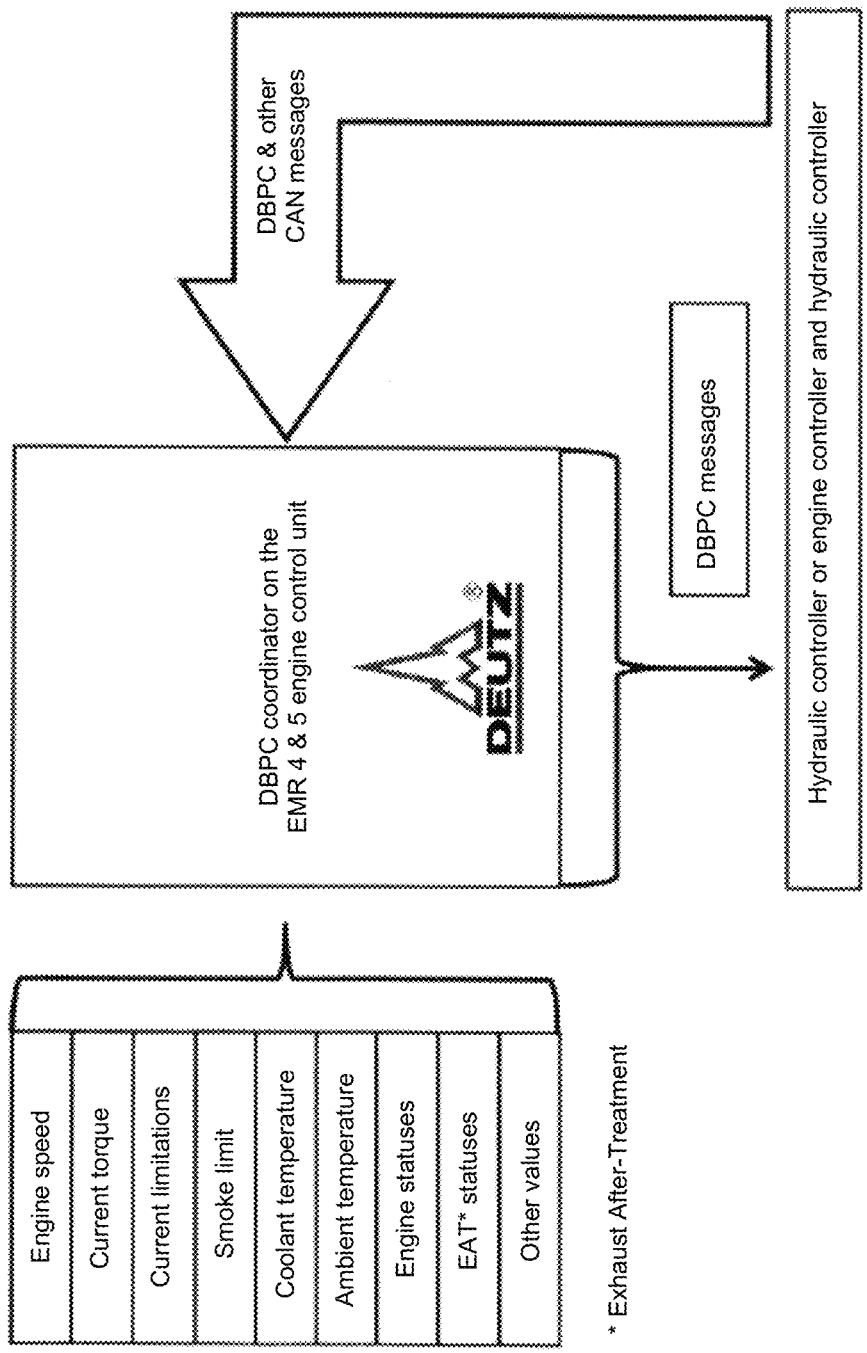
FIG. 1 shows the communication between the hydraulic control unit and the EMR 4 & 5 engine control unit.

SAE J1939 is used in the commercial vehicle sector for communication in the commercial vehicle. The properties of SAE J1939 will be briefly described.

SAE J1939 uses CAN (Controller Area Network, ISO11998) as the physical layer. It is a recommended practice that defines which and how data are transmitted between the Electronic Control Units (ECUs) within a vehicle network. Typical controllers are the engine, brake, transmission, etc. The special features of J1939 are an extended CAN identifier (29 bits), a bit rate of 250 kbit/s, peer-to-peer and broadcast communication, transport protocols for up to 1785 data bytes, network management, definition of parameter groups for commercial vehicles and other, manufacturer-specific parameter groups are supported, and diagnostic functions.

A number of standards exist which are derived from SAE J1939. These standards use the basic features of SAE J1939 with a different set of parameter groups and modified physical layers. These standards are, for example, ISO11783 for tractors and machinery for agriculture and forestry, which control the communication serially.

ISO11783 defines the communication between tractor and device on a device bus. It specifies some services on the application layer, such as Virtual Terminal, Tractor ECU, Task Controller and File Server. It adds an Extended Transport Protocol and Working Set Management.

NMEA2000, the serial data networking of marine electronic devices. It defines parameter groups for the communication between marine devices. It specifies the additional Fast Packet Transport Protocol.

ISO11992, exchange of digital information between towing vehicle and towed vehicle. It defines the exchange of information between the road vehicle and the towed vehicle. It uses the same parameter group format as J1939 on a different physical layer with 125 kbit/s.

FMS, the Fleet Management System. The FMS standard defines a gateway between the J1939 vehicle network and a fleet management system.

A parameter group is a set of parameters belonging to the same topic and having the same transmission rate. The definition of the application-relevant parameter groups and parameters may be found in the document SAE J1939-15 Reduced Physical Layer, 250K bits/sec, Un-Shielded Twisted Pair (UTP).

The length of a parameter group is not limited to the length of a CAN frame. A parameter group usually has a minimum length of 8 bytes up to 1785 bytes. Parameter groups with more than 8 bytes require a transport protocol for transmission.

The CAN identifier of a J1939 message contains a Parameter Group Number (PGN), source address, priority, data page bit, extended data page bit and target address (only for a peer-to-peer PG).

The identifier is composed as follows:
Priority: 3 bit
Extended Data Page: 1 bit
Data Page: 1 bit
PDU Format: 8 bit
PDU Specific: 8 bit
Source Address: 8 bit.

With PDU Format 240 (peer-to-peer), PDU Specific contains the target address. Global (255) may also be used as the target address. The parameter group is then aimed at all devices. In this case, the PGN is formed only of the PDU Format. With PDU Format>=240 (broadcast), the PDU Format together with the group extension in the PDU Specific field forms the PGN of the transmitted parameter group. Each parameter group is addressed via a unique number—the PGN. For the PGN, a 24-bit value is used composed of the 6 bits set to 0, PDU Format (8 bit), PDU Specific (8 bit), Data Page (1 bit) and Extended Data Page (1 bit).

There are two types of Parameter Group Numbers:

Global PGNs identify parameter groups that are sent to all (broadcast). In this case, the PDU Format, PDU Specific, Data Page and Extended Data Page are used for identification of the corresponding Parameter Group. In the case of global PGNs, the PDU Format is 240 or greater and the PDU Specific field is a Group Extension.

Specific PGNs are for parameter groups that are sent to particular devices (peer-to-peer). In this case, the PDU Format, Data Page and Extended Data Page are used for identification of the corresponding Parameter Group. The PDU Format is 239 or less and the PDU Specific field is set to 0.

With this breakdown of the PGNs, 240+(16*256)=4336 different parameter groups are possible within each data page. With the transmission of one parameter group, the PGN is coded in the CAN identifier.

With the Data Page bit and the Extended Data Page bit, 4 different data pages may be selected; see the following table.

TABLE 1

| Data Pages | | |
|---|---|---|
| Extended Data Page Bit | Data Page Bit | Description |
| 0 | 0 | SAE J1939 Page 0 Parameter Groups |
| 0 | 1 | SAE J1939 Page 1 Parameter Groups (NMEA2000) |
| 1 | 0 | SAE J1939 reserved |
| 1 | 1 | ISO 15765-3 defined |

Sample of a Parameter Group Definition:
Name: Engine temperature 1—ET1
Transmission rate: 1 s
Data length: 8 bytes
Extended Data Page: 0
Data Page: 0
PDU Format: 254
PDU Specific: 238
Default priority: 6
PG Number: 65,262 (00FEE16)
Description of Data:
Byte:
1 Engine Coolant Temperature
2 Engine Fuel Temperature 1
3, 4 Engine Oil Temperature 1
5, 6 Engine Turbocharger Oil Temperature
7 Engine Intercooler Temperature
8 Engine Intercooler Thermostat Opening.

Suspect Parameter Number (SPN)

A suspect parameter number is assigned to each parameter of a parameter group or component. It is used for diagnostic purposes to report and identify abnormal operation of a Controller Application (CA).

The SPN is a 19-bit number and has a range from 0 to 524287. For proprietary parameters, a range from 520192 to 524287 is reserved.

Special Parameter Groups

SAE J1939-21 defines some parameter groups on the data link layer:

Request Parameter Group

The request parameter group (RQST, PGN 00EA0016) may be sent to all or to a specific CA to request a certain parameter group. The RQST contains the PGN of the request parameter group. If the receiver of a specific request cannot respond, it must send a negative acknowledgment. The RQST has a data length code of 3 bytes and is the only parameter group with a data length code less than 8 bytes.

Acknowledgement Parameter Group

The acknowledgement parameter group (ACKM, PGN 00E80016) may be used to send a negative or positive acknowledgment, i.e. in response to a request.

Address Claiming Parameter Group

The address claiming parameter group (ACL, PGN 00EE0016) is used for network management, see below.

Commanded Address Parameter Group

The commanded address parameter group (CA, PGN 00FED816) may be used to change the address of a CA.

Transport Protocol Parameter Group

The transport protocol parameter groups (TPCM, PGN 00EC0016 and TPDT, PGN 00EB0016) are used to transfer parameter groups with more than 8 data bytes, see below.

Network Management

The software of an Electronic Control Unit (ECU) is the Controller Application (CA). An ECU may contain one or more CAs. Each CA has a unique address and an associated device name. Each message that is sent by a CA contains this source address. There are 255 possible addresses:

| | |
|---|---|
| 0 . . . 253 | Valid source addresses for CAs |
| 0 . . . 127 and 248 . . . 253 | Used for CAs with preferred addresses and defined functions |
| 128 . . . 247 | Available for all CAs |
| 254 | Null |
| 255 | Global. |

Most CAs such as Engine, Transmission, etc. have a preferred address (SAE J1939-01 Recommended Practice for Control and Communications Network for On-Highway Equipment). Before a CA may use an address, it must register itself on the bus. This procedure is called "address claiming." For this, the device sends an "Address Claim" parameter group (ACL, PGN 00EE0016) with the desired source address. This PG contains a 64-bit device name. If an address is already being used by another CA, then the CA whose device name has the higher priority has claimed the address.

The device name contains some information about the CA and describes its main function. A manufacturer code must be requested by the SAE. The values of the fields are defined in SAE J1939-81 [SAE J1939-31 Network Layer].

Address Claiming Procedure

In a common situation, the Controller Application sends an Address Claim parameter group at start-up and waits a defined amount of time. If it does not detect an address conflict, it may start with its normal communication.

In a situation where another CA is already using the address, an address conflict occurs. The CA with the higher priority of the device name obtains the address. The other CA must send a "Not Claim Address" parameter group with source address Null (254).

How to proceed when an address cannot be obtained depends on the address capability of a CA.

Request for Address Claim

A CA may detect other CAs in the network by requesting the ACL parameter group. It is permitted to use the Null address (254) as source address before a CA has performed the address claiming procedure. If the request is addressed to the Global address (255), all CAs in the network must respond with the ACL parameter group (including own CA if an address has already been claimed).

Address Capability

SAE J1939-81 defines the following types of capability to obtain an address:

Arbitrary Address Capable CA

The CA selects its source address by an internal algorithm. It is able to select a new address in the event of an address conflict. The Arbitrary Address Capable field in the device name indicates this capability.

Single Address Capable CA

A CA of this type may use only one address. In the event of address conflicts, it is not able to select another address. It may support the commanded address parameter group or proprietary mechanisms to change the address. The Arbitrary Address Capable field is not set for these CAs.

Transport Protocols

Parameter groups that contain more than 8 data bytes are transmitted with the aid of a transport protocol.

There are two different protocols for peer-to-peer and broadcast transmission. The transport protocols use two special parameter groups, which are used for Connection Management (TP.CM) and Data Transmission (TP.DT).

For broadcast transmission, the BAM (Broadcast Announce Message) protocol is used. In this case, after a BAM-PG, the transmitter sends all data PGs at a minimum interval of 50 ms.

With peer-to-peer transmission, the transmitter initiates the connection with a "Request to Send" message. The receiver then controls the transport protocol with "Clear to Send" and finally acknowledges it with "Acknowledge End of Message."

The diagnostic features of SAE J1939 support the following services:

reporting and identifying abnormal operation memory access monitored tests

One important parameter group is the Diagnostics Message 1 (DM1, PGN FECA16). If supported, it must be sent cyclically by each CA in order to report its state. The parameter group contains the state for different lamps:

malfunction indicator lamp red stop lamp amber warning lamp protect lamp.

An instrument cluster may use this information to report the state of the system to the driver.

In addition, the parameter group contains a list of Diagnostic Trouble Codes (DTCs). Together with the address of a sender, the parameter of malfunctioning components may be identified.

A DTC contains 4 bytes, which contain the SPN, the Failure Mode Identifier (FMI) and an Occurrence Count. If the DM1 contains more than one DTC, a transport protocol must be used.

By specifying the parameter groups, the CAN identifier scheme and the network management, a manufacturer-spanning cooperation of control units will be ensured.

J1939 describes, in addition to the mechanisms presented here, also the physical properties and the use of bus sub-segments.

In principle, these messages may be used to achieve a communication between different drive components/concepts and output components/concepts.

By way of example, mention may be made here of drive components such as: internal combustion engine (diesel/gasoline engines or other principles/fuels), electric drives, hybrid drives.

Mention must also be made of output components such as, for example: hydrostatic/dynamic components, mechanical components, electrical components, and combinations thereof.

The messages may also be used to optimize the consumption of other operating fluids, such as engine oil or urea solution for example.

The messages may also be used to increase the availability of the overall system and to reduce the need for standstill regeneration. This results in reduced wear and reduced maintenance.

FIG. 1 shows the communication between two controller application of two different electronic control units, the hydraulic control unit and the EMR 4 & 5 engine control unit, in the case of which it is possible to select the optimal engine operating point. The communication can be implemented via a CAN communication protocol system in the form of a CAN bus according to the J1939 standard, as described in detail above. The hydraulic control unit can control a hydraulic power take off device or a hydraulic pump for operating construction machinery of the vehicle.

The communication can be implemented via the CAN bus according to the J1939 standard.

The CAN communication protocol system is configured for exchanging data regarding operating states directly between a first controller application of the engine control unit and a second controller application of the hydraulic control unit. Each of the hydraulic control unit and the engine control unit can be provided with a communication interface of the CAN communication protocol system.

The CAN communication protocol system can be used to send a plurality of messages between the first controller application and the second controller application to select the operating point of the internal combustion engine. For example, the CAN communication protocol system is configured to transmit a first message from the second controller application to the first controller application requesting a power output from the internal combustion engine to the at least one output component. The CAN communication protocol system is further configured to, in response to the first message, transmit a second message from the first controller application to the second controller application specifying at least one possible operating point of the internal combustion engine for achieving the requested power output. The CAN communication protocol system is further configured to, in response to the second message, transmit a third message from the second controller application to the first controller application setting the speed of the internal combustion engine for achieving the requested power output. Then internal combustion engine can then be operated at the speed specified in the third message.

The CAN communication protocol system can also interact with a vehicle movement controller for controlling movement of the vehicle along the ground. The CAN communication protocol system can also communicate with communication interfaces on electronic control units of output devices such electric power take offs, for example in the form of electrical generators and mechanical gear boxes.

Figure 2:
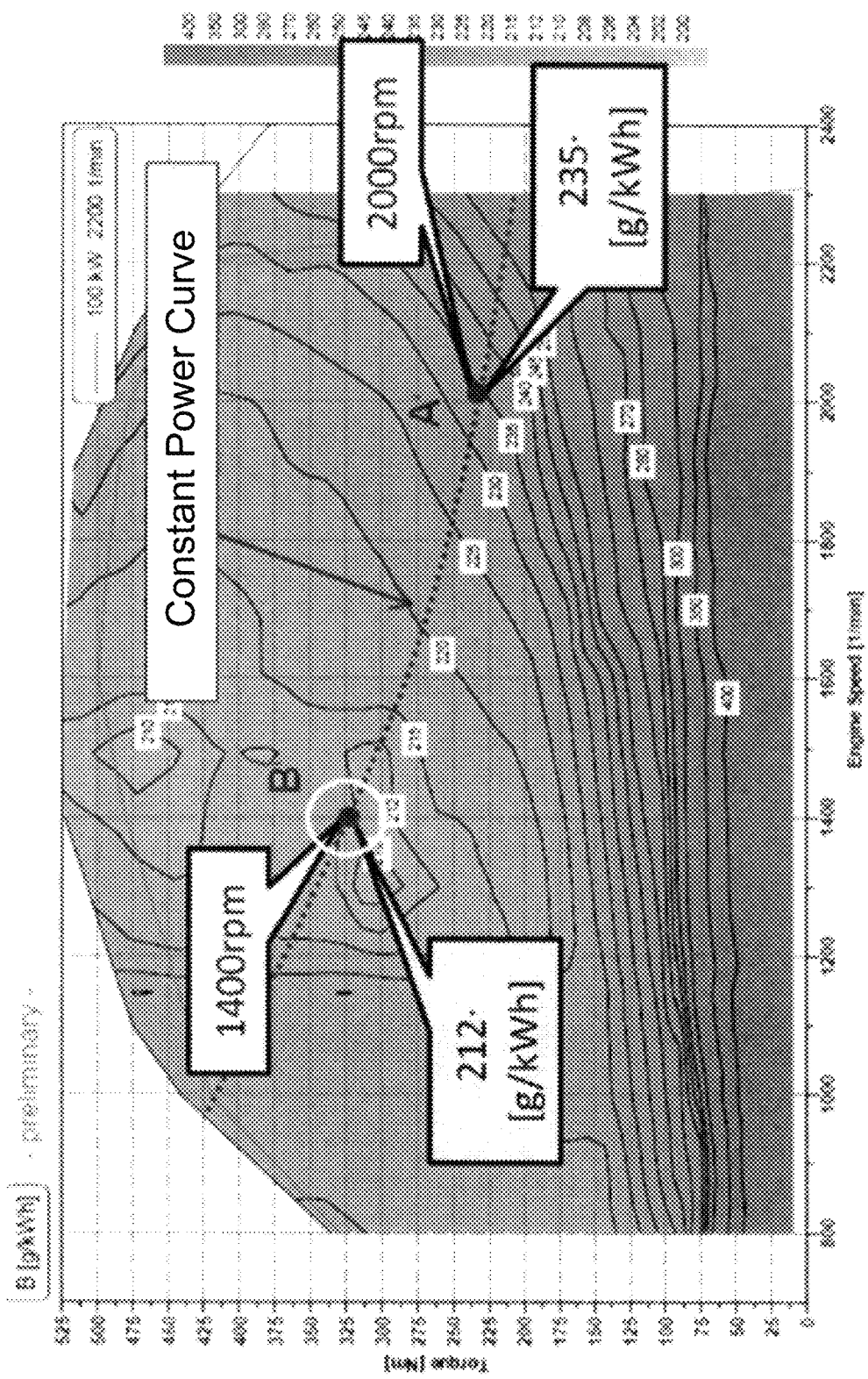
FIG. 2 shows the constant power curve in the diagram of torque over engine speed.

FIG. 2 shows the constant power curve in the diagram of torque over engine speed.

The engine control unit can determine suggested operating points in accordance with Deutz's Dynamic Best Point Control (DBPC) function, as can be illustrated with respect to FIG. 2, for transmitting to the hydraulic control unit or the vehicle movement controller.

Point A shown in the curve is the operating point without the Dynamic Best Point Control (DBPC) function. Point B shown in the curve is the operating point suggested by the Dynamic Best Point Control (DBPC) function. The fuel savings in the example from point A to point B are 23 g/kWh. A further consequence is a reduction in noise due to the lower engine speed.

What is claimed is:

1. A Controller Area Network (CAN) communication protocol system for an internal combustion engine for exchanging fuel consumption-optimizing and/or operating fluid consumption-optimizing and/or noise-optimizing messages between at least one drive components and at least one hydraulic output component for operating construction machinery of a vehicle,
wherein the CAN communication protocol system is configured for exchanging data regarding operating states directly between a first controller application of an electronic control unit of the at least one drive component and a second controller application of an electronic control unit of the at least one hydraulic output component,
the CAN communication protocol system comprising a first communication interface added on the electronic control unit of at least one the drive components and a communication interface added on the electronic control unit of the hydraulic output components.

2. The CAN communication protocol system as recited in claim 1 wherein the CAN communication protocol system is configured to transmit a first message from the second controller application to the first controller application requesting a power output from the internal combustion engine to the at least one output component.

3. The CAN communication protocol system as recited in claim 2 wherein the CAN communication protocol system is further configured to, in response to the first message, transmit a second message from the first controller application to the second controller application specifying at least one possible operating point of the internal combustion engine for achieving the requested power output.

4. The CAN communication protocol system as recited in claim 3 wherein the CAN communication protocol system is further configured to, in response to the second message, transmit a third message from the second controller application to the first controller application setting the speed of the internal combustion engine for achieving the requested power output.

5. The CAN communication protocol system as recited in claim 1 wherein the communication interfaces are SAE J1939 communication interfaces.

6. The CAN communication protocol system as recited in claim 1 wherein the at least one drive component is a plurality of drive components and/or the at least one output component is a plurality of output components and each of the one or more drive components and the one or more output components include a respective electronic control unit including a controller application, the CAN communication protocol system being configured for exchanging data regarding of operating states of each of the one or more drive components and the one or more output components directly between the controller applications.

7. The CAN communication protocol system as recited in claim 6 wherein the data is exchanged peer-to-peer between the control applications when a CAN identifier of a message includes a global Parameter Group Number (PGN) and the data is exchanged globally from one of the control applications to all of the other control applications when the CAN identifier of a message includes a specific PGN.

8. The CAN communication protocol system as recited in claim 1 wherein the at least one drive component is at least one of the internal combustion engine and an electric drive.

9. An internal combustion engine system comprising:
the Controller Area Network (CAN) communication protocol system as recited in claim 1.

10. An internal combustion engine system comprising:
a Controller Area Network (CAN) communication protocol system; and
a first electronic control unit for controlling an internal combustion engine, the first electronic control unit including a first controller application for sending messages to and receiving messages from a second controller application of a second electronic control unit via the CAN communication protocol system, the second electronic control unit configured for controlling at least one output component powered by the internal combustion engine,
wherein the CAN communication protocol system is configured to transmit a first message from the second controller application to the first controller application requesting a power output from the internal combustion engine to the at least one output component,
wherein the first controller application is configured to generate, in response to the first message, a second message, which the CAN communication protocol system is further configured to transmit to the second controller application, the second message specifying at least one possible operating point of the internal combustion engine for achieving the requested power output,
wherein the CAN communication protocol system is further configured to, in response to the second message, transmit a third message from the second controller application to the first controller application setting the speed of the internal combustion engine for achieving the requested power output.

11. The internal combustion engine system as recited in claim 10 wherein the at least one output component is at least one of a hydraulic component, a vehicle movement component and a power take off device.

12. The internal combustion engine as recited in claim 10 wherein an operating point of the engine is determined based on operating states of the drive components and the output components.

13. A method for operating the internal combustion engine system as recited in claim 10, comprising:
determining an operating point of the engine based on operating states of one or more of the drive components and the output components.

14. The method as recited in claim 13 wherein the determining of the operating point of the engine comprises the steps of:
transmitting, by the CAN communication protocol system, the first message from the second controller application to the first controller application requesting the power output from the internal combustion engine to the at least one output component;
generating, by the first controller application, in response to the first message, the second message and transmitting, by the CAN communication protocol system, the second message to the second controller application, the second message specifying at least one possible operating point of the internal combustion engine for achieving the requested power output; and
transmitting, by the CAN communication protocol system, in response to the second message, the third message from the second controller application to the first controller application setting the speed of the internal combustion engine for achieving the requested power output.

15. The method as recited in claim 14 further comprising operating the internal combustion engine at the speed specified in the third message.

16. The internal combustion engine as recited in claim 10 wherein the at least one output component is at least one hydraulic output component for operating construction machinery of a vehicle.

* * * * *